Feb. 24, 1959 H. W. COLLINS 2,875,351

POWER SUPPLY

Filed Nov. 22, 1957 2 Sheets-Sheet 1

WITNESSES

Edwin E. Baesler

Myron E. Click

INVENTOR

H. William Collins

BY F. E. Browder

ATTORNEY

Feb. 24, 1959 H. W. COLLINS 2,875,351

POWER SUPPLY

Filed Nov. 22, 1957 2 Sheets-Sheet 2

2,875,351

POWER SUPPLY

Howard William Collins, El Segundo, Calif., assignor to Westinghouse Electric Corporation, East Pittsburgh, Pa., a corporation of Pennsylvania Application November 22, 1957, Serial No. 698,190

7 Claims. (Cl. 307—88)

This invention relates to power supplies in general and in particular to constant frequency and voltage alternating-current power supplies.

There is a widespread need in both military and remotely located industrial equipment for small and reliable alternating-current power supplies which have both voltage and frequency accurately regulated. It is, accordingly, an object of this invention to provide an improved power supply.

It is a further object of this invention to provide an improved alternating-current power supply utilizing static magnetic and semiconductor components to provide a regulated supply which is small, rugged, efficient and has a fast response.

Further objects of this invention will become apparent from the following description when taken in conjunction with the accompanying drawings. In said drawings, for illustrative purposes only, are shown preferred forms of the invention.

Figure 1:
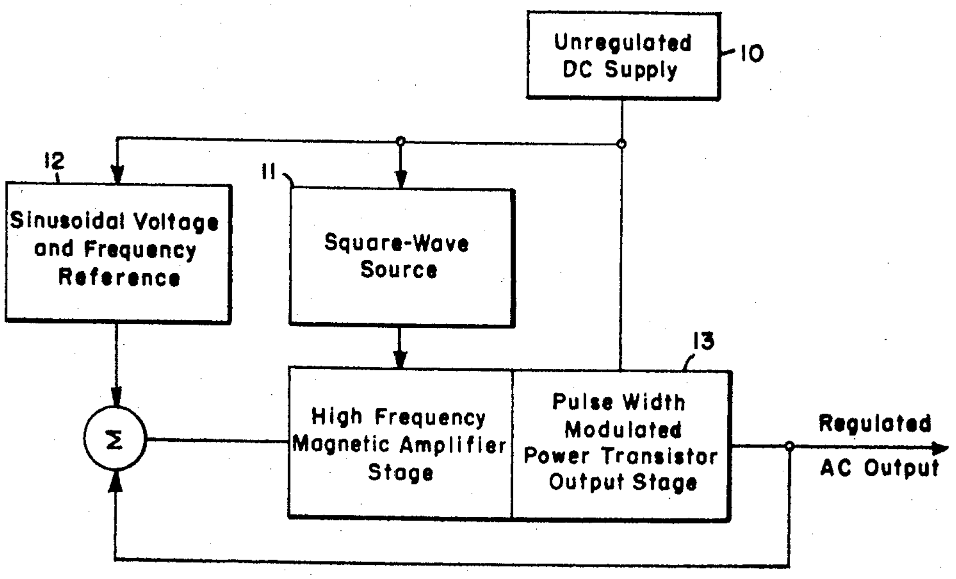
Fig. 1 is a block diagram of a power supply embodying the teachings of this invention.

In the drawings the manner in which the windings have been wound upon the cores is denoted by the polarity dot convention. That is, current flowing into the polarity dot end of a winding will drive the inductively associated core toward positive saturation. Current flowing out of the polarity dot end of a winding will drive the inductively associated core away from positive saturation.

Referring to Fig. 1, there is illustrated a block diagram of a constant frequency and voltage alternating-current power supply embodying the teachings of this invention. In general, this power supply comprises an unregulated direct current supply 10, a square wave source 11, a sinusoidal voltage and frequency reference 12 and a two-stage amplifier 13.

The output of the unregulated direct-current supply 10 is connected to the input of the square wave source 11, the input of the voltage and frequency reference 12 and to the transistor output stage of the amplifier 13. The output of the square wave source 11 is connected to drive the input magnetic amplifier stage of the amplifier 13. The output of the voltage and frequency reference 12 is connected to the input of the magnetic amplifier stage of the amplifier 13. The output of the transistor output stage of the amplifier 13 is fed back to the input of the magnetic amplifier stage of the amplifier 13. The output from the transistor output stage of the amplifier 13 is the regulated alternating-current output for the system.

The key element in the system illustrated in Fig. 1 is the control system for switching transistors referred to herein as the two-stage alternating-current amplifier 13 which uses a high frequency magnetic amplifier stage operating from the square wave source 11 to pulse width modulate the switching transistor output stage. To achieve the regulated output, the amplifier 13 is excited by a low power voltage and frequency reference 12 which has constant output voltage and frequency. A large amount of negative feedback is applied to the input of the amplifier 13 to stabilize the output of the system against variations which can result from amplifier gain changes caused by variations in the supply voltage, ambient temperature effects, component aging or variations in load.

Figure 2:
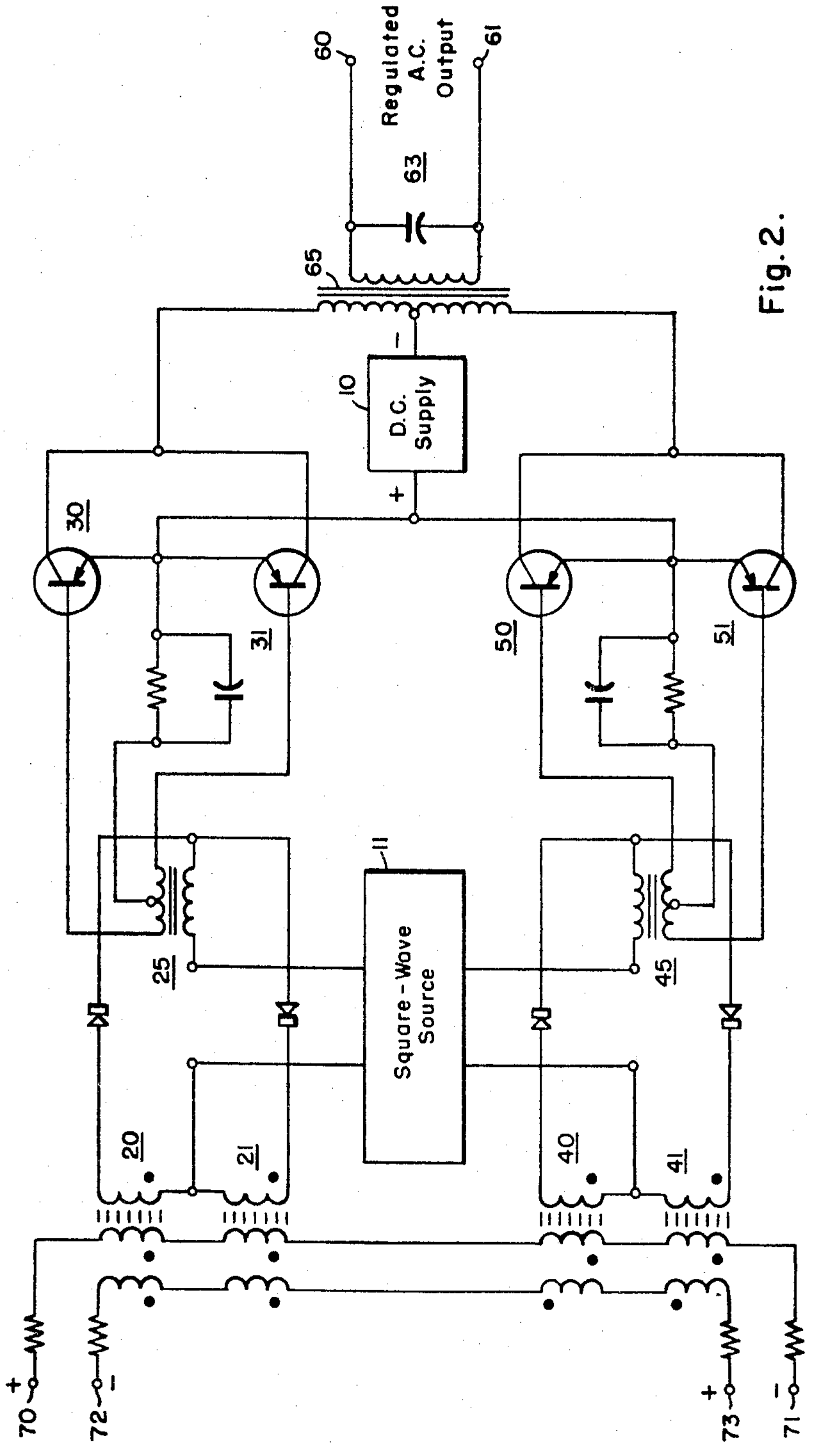
Fig. 2 is a schematic diagram of an amplifier utilized in the embodiment illustrated in Fig. 1.

A schematic diagram of the amplifier 13 is shown in Fig. 2. In a copending application, Serial No. 593,200, filed June 22, 1956, entitled "Control Systems for Switching Transistors," assigned to the same assignee as the present application, such an amplifier is disclosed. In general, the amplifier illustrated in Fig. 2 comprises two pairs of magnetic amplifiers 20, 21 and 40, 41, two pairs of output switching transistors 30, 31 and 50, 51, an output transformer 65 and a carrier frequency filter 63. The square wave souce 11 of Fig. 1 is shown connected to drive the magnetic amplifiers 20, 21, 40 and 41. The direct current supply 10 of Fig. 1 is shown connected to the output switching transistors 30, 31, 50 and 51.

The magnetic amplifiers 20, 21, 40 and 41 each comprises a magnetic core member, a power winding, a bias winding and a control winding. The bias windings for the magnetic amplifiers 20, 21, 40 and 41 are connected in series between the terminals 70 and 71 to which a source of direct current is to be applied. The control windings of the magnetic amplifiers 20, 21, 40 and 41 are connected in series between the terminals 72 and 73.

The magnetic amplifiers 20, 21 and 40, 41 may be of any well known type commonly used in control circuits for obtaining a predetermined gain. The gain obtained from the magnetic amplifiers will depend on the specification for which they have been designed.

The square wave source 11 may be a transistor inverter. Devices of this type are known in the art and need not be described in detail. The direct current supply 10 may be any suitable direct current source.

The operation of the apparatus illustrated in Fig. 2 is is as follows. The first-stage magnetic amplifiers 20, 21, 40 and 41 are operated from an audio frequency transistor inverter denoted as the square wave source 11. On one half-cycle of the reference signal to be applied to the terminals 72 and 73 from the voltage and frequency reference 12, the magnetic amplifiers 20 and 21 will pulse width modulate the transistors 30 and 31 at the carrier frequency rate of the square wave source 11. The pulse width output of the transistors 30 and 31 will be proportional to the instantaneous value of the reference signal applied to the terminals 72 and 73. As denoted in Fig. 2 by the polarity dot markings on the control windings, the magnetic amplifiers 40 and 41 and thus the transistors 50 and 51 are held at cut-off. On the next half-cycle, the magnetic amplifiers 40 and 41 will pulse width modulate the transistors 50 and 51 at a carrier frequency rate. The pulse width will again be proportional to the instantaneous value of the reference signal applied to the terminals 72 and 73.

The transformers 25 and 45 serve to connect the output of the two pairs of magnetic amplifiers 20, 21 and 40, 41, respectively, to two of the three electrodes of each of the output transistors 30, 31 and 50, 51, respectively, in such a manner that the output of the magnetic amplifiers will switch the transistors thereby pulse width modulating the output pulses of the transistors.

On each half-cycle, a power frequency variation in flux will occur in the output transformer 65 and when the carrier frequency filter, denoted generally at 63, filters the carrier frequency pulses a smooth sine wave output at the terminals 60 and 61 will result. If reduced output power at the terminals 60 and 61 is sufficient, only two output transistors will be required.

For a more detailed description of the nature and operation of the apparatus illustrated in Fig. 2, reference is again made to the foregoing copending application, Serial No. 593,200, entitled "Control Systems for Switching Transistors."

The method of feeding back a portion of the output of this control system for switching transistors to the input or the control winding of the magnetic amplifier of the first stage may be a full-wave rectifier connected across the output of the control system. The method may also be that of connecting a resistor in series with the output and feeding back the voltage developed thereacross or any other suitable means known to those skilled in the art. Including in the feedback circuit, of course, would be any suitable means for limiting the amount of feedback.

Figure 3:
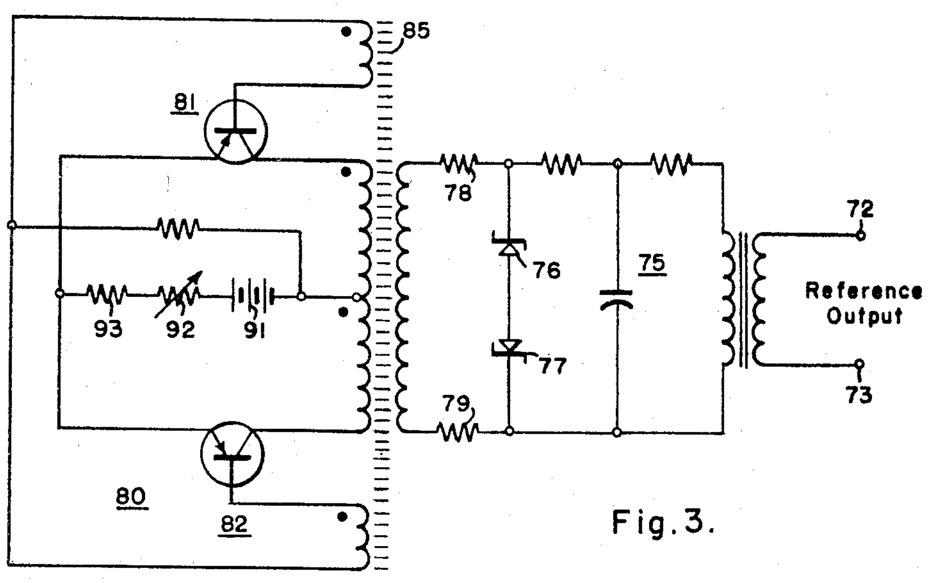
Fig. 3 is a schematic diagram of a voltage and freqency reference which may be utilized in the block diagram of Fig. 1.

A static voltage and frequency standard suitable for use in the embodiment of the invention illustrated in Fig. 1 is schematically shown in Fig. 3. In general, the apparatus illustrated in Fig. 3 comprises a transistor inverter 80 comprising a pair of semiconductor devices 81 and 82 and a magnetic core 85, a direct current source 91, reference diodes 76 and 77 and a sine wave filter 75.

The transistor inverter 80 is generally known in the art and need not be described in detail here. In brief, however, the semiconductor devices 81 and 82 are connected to alternately switch the source of direct-current voltage 91 to a pair of primary windings inductively disposed on the saturable magnetic core 85.

The inverter 80 generates a square wave whose frequency is directly proportional to the magnitude of the voltage from the direct current source 91 and inversely proportional to the saturation flux density of the magnetic core 85. The primary frequency changes in a transistor inverter are due to changes in the supply voltage furnished by the direct current source 91 or the saturation flux density of the magnetic core member 85 and a satisfactory reference can be constructed if these changes are satisfactorily compensated.

Variations in the voltage supplied by the direct current source 91 can be held to a very small value by driving the inverter 80 with a commercially available silicon diode reference. Changes in the saturation flux density of the magnetic core member 85, which are caused by ambient temperature variations, may be compensated for by connecting a positive temperature coefficient resistor 93 in series with the supply voltage furnished by the direct current source 91. If a constant load is imposed upon the inverter 80, a change in the ambient temperature will result in a proportional change in the voltage drop across the resistor 93. By the proper choice of a positive temperature coefficient resistor 93, the change in voltage drop across the resistor 93 is made to compensate for the change in saturation flux density, thereby holding the frequency of the inverter 80 constant.

The series adjustable resistor 92 is used as a trimmer to set the frequency exactly on the desired value. With a constant load on the inverter 80, a change in voltage drop across the resistor 92 can be used to slightly alter the frequency without significantly effecting the temperature compensation.

Changes in the resistor 93 cause the voltage amplitude of the output of the inverter 80 to change although the frequency remains constant. The change in voltage amplitude is compensated for by placing a pair of semiconductor diodes, such as silicon diodes, in a back-to-back connection on the output of the circuit. By utilizing the characteristic referred to in the art as the Zener breakdown effect of the silicon diodes 76 and 77, a constant voltage at the output of the circuit is obtained. The filter designated generally at 75 may be of the T type as shown or any other suitable filter for converting the amplitude and frequency stabilized square wave to a sine wave. The impedances 78 and 79 are included for current limiting purposes in series with the output. The output at the terminals 72 and 73 will then be a sinusoidal voltage which is amplitude and frequency stabilized and will be applied to the terminals 72 and 73 of the control circuit of the apparatus illustrated in Fig. 2.

In conclusion, it is pointed out that while the illustrated example constitutes a practical embodiment of my invention, I do not limit myself to the exact details shown since modification of the same may be varied without departing from the spirit of this invention.

I claim as my invention:

1. In a power supply, in combination, a control switching system and means providing voltage and frequency reference signal, said control switching system comprising a magnetic amplifier provided with power and control windings, means for connecting said power winding of said amplifier to a source of square wave voltage, a transistor having three electrodes, circuit means applying the output of said power winding of said amplifier between two of said three electrodes of said transistor, rectifier means disposed in said power winding circuit means restricting the application of said power winding output to said two electrodes to alternate half-cycles of said source of square wave voltage, means for connecting a direct current source between one of said two electrodes and said third electrode of said transistor, said transistor serving as a switch to control the flow of current from said direct current source to an output means, and means for applying a reference signal obtained from the voltage and frequency reference means to said control winding of said amplifier.

2. In a power supply, in combination, a control switching system and sinusoidal voltage and frequency reference means, said control switching system comprising a magnetic amplifier provided with power and control windings, said amplifier having high gain and linear characteristics, means for connecting said power winding of said amplifier to a source of square wave voltage, a transistor having three electrodes, circuit means applying the output of said power winding of said amplifier between two of said electrodes of said transistor, rectifier means disposed in said power winding circuit restricting the application of said power winding output to said two electrodes to alternate half-cycles of said source of square wave voltage, means for connecting a direct current voltage source between one of said two electrodes and said third electrode of said transistor, said transistor serving as a switch to control the flow of current from said direct current source to an output and means for applying a reference signal obtained from the voltage and frequency reference means to said control winding of said amplifier.

3. In a power supply, in combination, a control switching system and a sinusoidal voltage and frequency reference means, said control switching system comprising a magnetic amplifier provided with power and control windings, said amplifier having high gain and linear characteristics, means for connecting said power winding of said amplifier to a source of carrier frequency square wave voltage, a transistor having three electrodes, circuit means applying the output of said power winding of said amplifier between two electrodes of said transistor, rectifier means disposed in said power winding circuit restricting the application of said power winding output to said two electrodes to alternate half-cycles of said source of square wave voltage, means for connecting a direct current source between one of said two electrodes and said third electrode of said transistor, said transistor serving as a switch to control the flow of current from said direct current source to an output having a carrier frequency filter connected across an output winding thereof, means connecting a portion of the output of said control switching system as negative feedback to said control winding of said amplifier, and means for applying a reference signal obtained from the voltage and frequency reference means to said control winding of said amplifier.

4. In a power supply, in combination, a control switching system and a sinusoidal voltage and frequency reference means, said control switching system comprising a magnetic amplifier provided with power and control windings, said amplifier having high gain and linear characteristics, means for connecting said power winding of said amplifier to a source of carrier frequency square wave voltage, a transistor having three electrodes, circuit means applying the output of said power winding of said amplifier between two electrodes of said transistor, rectifier means disposed in said circuit means restricting the application of said power winding output to said two electrodes to alternate half-cycles of said source of square wave voltage, means for connecting a direct current source between one of said two electrodes and said third electrode of said transistor, said transistor serving as a switch to control the flow of current from said direct current source to an output having a carrier frequency filter connected there across means for connecting a portion of the output of said control switching system as feedback to said control windings of said amplifier, said voltage and frequency reference means comprising a transistor inverter having a pair of semiconductor devices connected to alternately switch a source of direct current to a pair of primary windings inductively disposed on a saturable magnetic core, means for connecting said source of direct-current voltage to said semiconductor devices and said pair of primary windings, an output winding inductively disposed on said saturable core, and means for applying a reference signal obtained from said voltage and frequency reference means to said control winding of said amplifier.

5. In a power supply, in combination, a control switching system and a sinusoidal voltage and frequency reference means said control switching system comprising a magnetic amplifier provided with power and control windings, said amplifier having high gain and linear characteristics, means for connecting said power winding of said amplifier to a source of carrier frequency square wave voltage, a transistor having three electrodes, circuit means applying the output of said power winding of said amplifier between two of said electrodes of said transistor, rectifier means disposed in said circuit means restricting the application of said power winding output to said two electrodes to alternate half-cycles of said source of square wave voltage, means for connecting a direct current source between one of said two electrodes and said third electrode of said transistor, said transistor serving as a switch to control the flow of current from said direct current source to an output transformer having a carrier frequency filter connected across an output winding, means for connecting a portion of the output of said control switching system as negative feedback to said control windings of said amplifier, said voltage and frequency reference means comprising a transistor inverter having a pair of semiconductor devices connected to alternately switch a source of direct current to a pair of primary windings inductively disposed on a saturable magnetic core, means for connecting said source of direct-current voltage to said semiconductor devices and said primary windings, an output winding inductively disposed on said saturable core and frequency compensating means connected in series with said direct current source of said reference means.

6. In a power supply, in combination, a control switching system and a sinusoidal voltage and frequency reference means, said control switching system comprising a magnetic amplifier provided with power and control windings, said amplifier having high gain and linear characteristics, means for connecting said power winding of said amplifier to a source of carrier frequency square wave voltage, a transistor having three electrodes, circuit means applying the output of said power winding of said amplifier between two of said electrodes of said transistor, rectifier means disposed in said circuit means restricting the application of said power winding output to said two electrodes to alternate half-cycles of said source of square wave voltage, means for connecting a direct current source between one of said two electrodes and said third electrode of said transistor serving as a switch to control the flow of current from said direct current source to an output transformer having a carrier frequency filter connected across an output winding, means for connecting a portion of the output of said control switching system as negative feedback to said control windings of said amplifier, said voltage and frequency reference means comprising a transistor inverter having a pair of semiconductor devices connected to alternately switch a source of direct current voltage to a pair of primary windings inductively disposed on a saturable magnetic core, means for connecting said source of direct-current voltage to said semiconductor devices and said primary windings, an output winding inductively disposed on said saturable magnetic core, frequency compensating means connected in series with said direct-current voltage source of said reference, and a voltage compensating means comprising a pair of semiconductor diodes poled in opposite directions connected in series across said output winding of said reference.

7. In a power supply, in combination, a control switching system and a sinusoidal voltage and frequency reference means, said control switching system comprising a magnetic amplifier provided with power and control windings, said amplifier having high gain and linear characteristics, means for connecting said power winding of said amplifier to a source of carrier frequency square wave voltage, a transistor having three electrodes, circuit means applying the output of said power winding of said amplifier between two of said electrodes of said transistor, rectifier means disposed in said circuit means restricting the application of said power winding output to said two electrodes to alternate half-cycles of said source of square wave voltage, means for connecting a direct current source between one of said two electrodes and said third electrode of said transistor, said transistor serving as a switch to control the flow of current from said direct current source to an output transformer having a carrier frequency filter connected across an output winding, means for connecting a portion of the output of said control switching system as negative feedback to said control windings of said amplifier, said voltage and frequency reference frequency means comprising a transistor inverter having a pair of semiconductor devices connected to alternately switch a source of direct-current voltage to a pair of primary windings inductively disposed on a saturable magnetic core, means for connecting said source of direct-current voltage to said semiconductor devices and said primary windings, an output winding inductively disposed on said saturable magnetic core, frequency compensating means connected in series with said direct-current voltage source of said reference means, voltage compensating means comprising a pair of semiconductor diodes poled in opposite directions connected in series across said output winding of said reference means, and filter means for converting a square wave to a sine wave connected across said output winding of said reference means.

No references cited.